United States Patent [19]

Stalego

[11] 4,101,475

[45] Jul. 28, 1978

[54] FLAME RESISTANT MATERIALS AND METHOD OF MAKING SAME

[75] Inventor: Joseph P. Stalego, Newark, Ohio

[73] Assignee: Owens-Corning Fiberglas Corporation, Toledo, Ohio

[21] Appl. No.: 754,926

[22] Filed: Dec. 17, 1976

[51] Int. Cl.² ........................................... C08G 12/32
[52] U.S. Cl. ...................................... 260/21; 156/306; 156/331; 156/335; 260/29.4 R; 260/39 R; 260/DIG. 24; 428/436;524;921
[58] Field of Search ............... 260/DIG. 24, 39 R, 21, 260/29.4 R; 156/331, 335

[56] References Cited

U.S. PATENT DOCUMENTS

| | | | |
|---|---|---|---|
| 1,482,357 | 1/1924 | Ellis | 260/39 R |
| 3,597,375 | 8/1971 | Ludwig et al. | 156/335 |
| 3,677,999 | 7/1972 | Denk et al. | 260/38 |
| 3,733,283 | 5/1973 | Duggins | 260/DIG. 24 |
| 3,734,814 | 5/1973 | Davis et al. | 156/87 |
| 3,931,095 | 1/1976 | Kondo et al. | 260/38 |
| 3,957,556 | 5/1976 | Wilson et al. | 156/87 |
| 3,960,626 | 6/1976 | Casadevall | 156/331 |
| 4,005,036 | 1/1977 | Stalego | 260/21 |
| 4,014,726 | 3/1977 | Fargo | 156/331 |

OTHER PUBLICATIONS

In re Staeger, 183F.2d99;86U.S.P.Q.368; 640, decided Jun. 30, 1950.

*Primary Examiner*—Ronald W. Griffin
*Attorney, Agent, or Firm*—Ronald C. Hudgens; Patrick P. Pacella; William P. Hickey

[57] ABSTRACT

A scratch resistant, flame resistant material is made by producing a sheet molding compound of a melamine-aldehyde precondensate, silica, alumina trihydrate, slightly soluble soap, ammonium hydroxide and acid salt catalyst. The sheet molding compound is applied to the surface of a pelt of glass fibers containing a heat curable binder and the composite is bonded together under heat and pressure to cure both binders simultaneously and bond the sheet molding compound to the fiber layer of the pelt.

15 Claims, 1 Drawing Figure

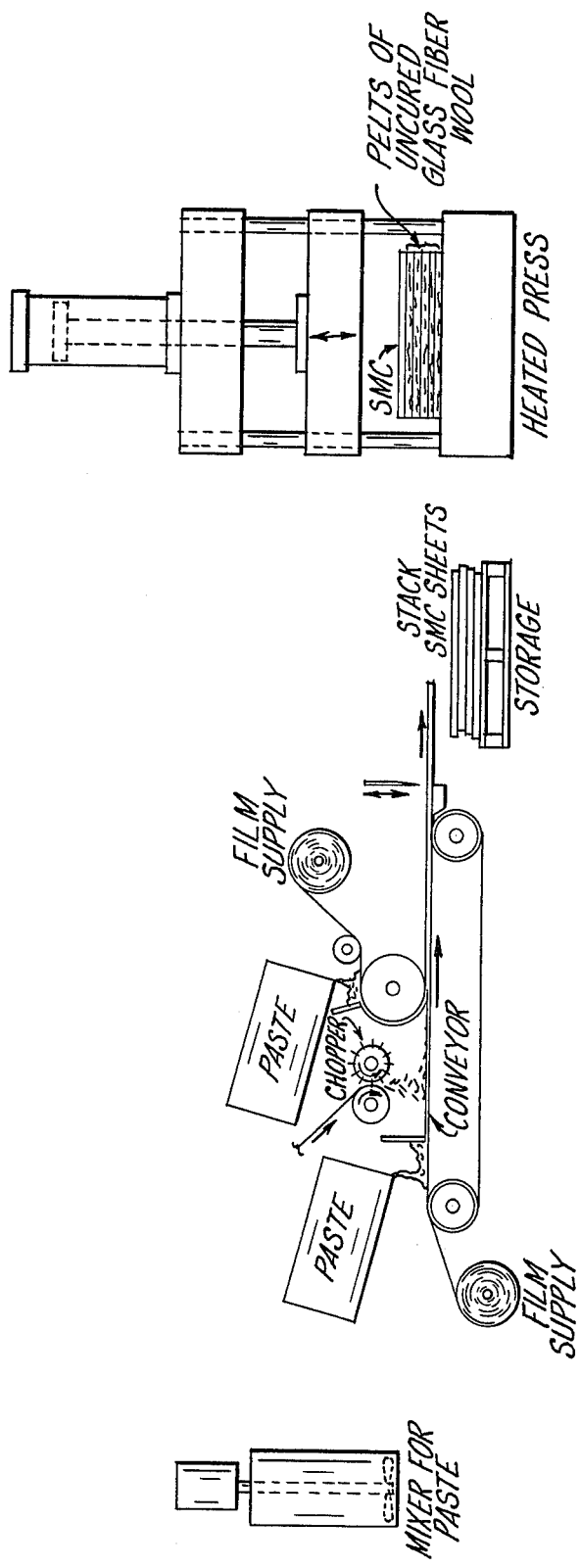

FLAME RESISTANT MATERIALS AND METHOD OF MAKING SAME

The present invention relates to a new and improved flame resistant material, a molding compound for producing the same, a fugitive retarder-catalyst system for the molding compound, and a new and improved method of producing inorganic fiber board having a hard surfacing thereon.

BACKGROUND OF THE INVENTION

A need has long existed for a flame proof wallboard for dwellings, hospitals, and other public buildings to take the place of marble, tile, and other hard fire proof surfacing materials which are now too expensive for general use in the building industry. The usual drywall board comprising gypsum between two layers of paper is not sufficiently fire resistant for hospitals and public buildings, nor is the painted fiber board that is presently available. Concrete materials are not sufficiently strong to resist scratching and they are too porous to meet santitary codes for hospitals. The same is generally true of cement bonded fiber boards, such as masonite, etc.

Accordingly, it is an object of the present invention to produce an inexpensive light weight paneling which has a surface which has a very low flame spread rate, that liberates very little smoke when subjected to temperatures of 1,000° F or more, and which contributes practically no fuel to a fire that is contained by the paneling.

Another object of the present invention is the provision of a wallboard of the above described type having a smooth dense surface that cannot be scratched by a carbon steel knife.

Another object of the present invention is the provision of a new and improved molding compound for producing such fire resistant surfaces.

Another object of the invention is the provision of a new and improved retarder-catalyst system for aldehyde condensate resins.

A further object of the present invention is the provision of a new and improved method of making a fiber board.

BRIEF DESCRIPTION OF THE DRAWINGS

The solitary FIGURE of the drawing is a schematic representation of a preferred method of making wallboard according to principles of the

DESCRIPTION OF THE PREFERRED EMBODIMENTS

According to the principles of the present invention, it has been discovered that unique fire resistant properties are provided by inorganic fillers that contain aluminum trihydrate when bonded together by an aldehyde condensate resin. It appears that aluminum trihydrate protects the bond which it has with an aldehyde condensate resin and particularly melamine resins in that it gives off water vapors in generally two stages starting as low as approximately 400° F and continuing to a temperature of approximately 570° F. On the other hand, the aldehyde condensate resins, and particularly melamine resins, only slowly oxidize at such temperatures and do not pyrolytically disintegrate at any appreciable rate until it is at a temperature above the water liberation temperature of the aluminum trihydrate. During the first stage of water liberation from aluminum trihydrate, it is converted to a monohydrate which is also crystalline, so that the crystalline structure to which the resin is bonded is maintained until the final stage of liberation of the water vapor.

While all of the reasons for the unique combination are not known, it is also believed that at temperatures of about 570° F the nascent aluminum oxide that is produced reacts with the methylol groups, and/or nitrogen compounds to form methoxides and then carbides and when slightly soluble forms of silicate are present, aluminum silicates.

According to further principles of the invention, a new retarder-catalyst system is provided for aldehyde condensate resins which will allow the aldehyde condensate resins to thicken at room temperature in a controlled manner following which the retarders are driven off to allow the aldehyde condensate resins to cure. Such a retarder-catalyst system has particular advantages when making sheet molding compound.

According to still further principles of the invention, a new and improved method is provided for making surfaced wallboard by taking a layer of the sheet molding compound of the present invention, superimposing it on top of a layer of inorganic fibers containing uncured aldehyde condensate prepolymer as a potential binder, and pressing the sheet molding compound and fiber-binder layers together at elevated temperatures to cure the binder of the surfacing layer while also simultaneously curing the prepolymer of the back-up layer, and bonding the two layers together.

Some of the advantages of the present invention will be made apparent by the following examples:

EXAMPLE 1

A sheet molding compound is made from the following materials in the parts by weight indicated:

| | |
|---|---|
| Alumina trihydrate (50–80 micron) | 2400 |
| Alumina trihydrate (6.5–9.5 micron) | 2400 |
| Powdered silica (−200 mesh) | 4200 |
| Quintas quartz | 3000 |
| A-staged melamine-formaldehyde prepolymer | 3200 |
| Ammonium chloride (catalyst) | 22 |
| Zinc stearate (retarder) | 352 |
| Ammonium hydroxide (retarder) | 90 |
| Titanium dioxide (−200 mesh) | 456 |
| Water | 2950 |

The above materials were prepared by mixing the ammonium hydroxide in water followed by the melamine-formaldehyde prepolymer. Thereafter, the ammonium chloride is dissolved therein. The fine alumina trihydrate is then added followed by the coarse alumina trihydrate. Thereafter, the fine silica is blended therein, followed by the coarser quintas quartz. After a homogenous slurry is produced, the zinc stearate in powder form is added and dispersed throughout.

A sheet molding compound is made from the slurry using the procedure taught in the Davis, Wood, and Miller U.S. Pat. No. 3,615,979. A 20 mil thickness of the slurry is spread onto a first polyethylene carrier sheet, and another 20 mil thickness of the slurry is spread onto a second polyethylene carrier sheet. Twenty-eight grams per square foot of ¼-inch long chopped fiber strand is delivered evenly to the top of the slurry on the first carrier sheet, and the second layer of the slurry is brought down on top of the layer of chopped strand. The two layers of slurry are forced together to embed the chopped strand generally uniformly throughout the slurry to form a sheet molding compound. The sheet molding compound separated by the polyethylene sheets is cut into sheets and is allowed to thicken from 24 to 96 hours into a handleable and slightly tacky state.

The sheet molding compound so produced can be used as a surfacing for any type of substrate, or a number of thicknesses of the sheet molding compound can be pressed together and cured into a dense board. In most instances, however, a light weight wallboard is desired; and according to further principles of the present invention, this is produced in a new and improved way by superimposing five pelts that each comprise a 3-inch thickness of air blow glass fiber wool having a ½ pound per cubic foot density that is wetted out with a binder forming solution comprising a phenol-formaldehyde partial condensate containing urea, and dicyandiamide in an amount to provide approximately 30% nitrogen based on resin solids. A layer of the sheet molding compound produced as above described is placed on top of the five pelts and the composite is placed between heated platens of a press and are cured at 350° F and a pressure of 200 psi for 12 minutes. This procedure produces a composite of a substrate approximately ¼-inch thick of bonded glass fibers having a density of 45 pounds per cubic foot and approximately a 40 mil thick surfacing of the cured sheet molding compound. The surfacing layer is adequately bonded to the glass fiber substrate with only a slight penetration of the sheet molding compound into the surface of the glass fiber substrate. It can be seen that this procedure not only simultaneously cures the binder of the surfacing layer, and the substrate, but also bonds the two layers together at the same time.

The above described procedure produces a remarkable material, the surface of which cannot be scratched by a carbon steel knife, and when flame tested according to the ASTM E-84 tunnel test has a flame spread rate of approximately 12, a fuel contribution of approximately 4, and a smoke development of approximately 12.

EXAMPLE II

The process of Example I is repeated excepting that the melamine-formaldehyde resin is replaced with a phenol-formaldehyde, urea, dicyandiamide mixture that was used for the binder of the glass fiber board. The product produced has substantially the same properties as that of Example I, but differs principally therefrom in that a slight yellow color exists in the surfacing.

EXAMPLE III

The process of Example II is repeated excepting that the zinc stearate is replaced by aluminum stearate, and the aluminum chloride is replaced with a lignin sulfonate. The wallboard produced has substantially the same properties as that of Example I.

EXAMPLE IV

The process of Example I is repeated excepting that the zinc stearate is replaced with ammonium palmitate and the wallboard produced has substantially the same properties as that of Example I.

EXAMPLE V

The process of Example I is repeated excepting that the zinc stearate is replaced with calcium palmitate, and the wallboard produced has substantially the same properties as that of Example I.

In general, molding compounds for producing flame resistant surfaces can be prepared within the range of materials given below in parts by weight:

| Ingredients | Parts by Weight |
| --- | --- |
| Alumina trihydrate | from 15 to 80 |
| Other inorganic fillers | 0 to 50 |
| Aldehyde condensate prepolymers | from 15 to 45 |
| Fatty acid salts | 0 to 4.0 |
| Ammonia hydroxide retarder | from 0.1 to 3.0 |
| Acid salt catalyst | 0.05 to 0.5 |

Wall surfaces having a hard white surface, which are the preferred materials of the present invention, can be produced within the range of materials given below in parts by weight:

| Ingredients | Parts by Weight |
| --- | --- |
| Alumina trihydrate | 20 to 40 |
| Granular silica fillers | 35 to 50 |
| Titania | 0 to 5 |
| Melamine-formaldehyde prepolymers | 15 to 30 |
| Fatty acid salts | 1 to 5 |
| Acid salt catalysts | 0.05 to 0.5 |
| Ammonia hydroxide | 0.5 to 3.0 |

In all cases, the most preferred materials will include an inorganic fiber reinforcement, as for example, chopped glass fibers in an amount between 1 and approximately 30% based on the slurry solids. When a large volume of glass fibers is to be incorporated into the molding compound, a larger amount of water than that given in Example I will be used, and the amount can easily be determined by adding water until the proper consistency is reached.

Any type of acid salt catalyst can be used, as is known in the art, as for example, ammonium chloride, ammonium sulfate, ammonium nitrate, lignin sulfonate, etc. Ammonium salts are preferred in that a beneficial buffering action is achieved with the ammonium hydroxide.

Any type of fatty acid salt can be utilized as the permanent retarder provided that it is generally insoluble, or only slightly soluble in cold water, has increased solubility in warm water, and in addition has its solubility increased by ammonium hydroxide. These salts will include the zinc salts, calcium salts, magnesium salts, etc.

The alumina trihydrate liberates water vapor starting at a temperature of approximately 400° F and provides a beneficial affect with respect to prolonging the life of the binder that is generally proportional to the amount that is present. For best results, however, the amount used should be more than approximately 15% by weight of the solids of the molding compound. Other inorganic fillers can be used, and by selecting materials that are harder than steel, a nonscratching surface can be provided. In this respect, one of the most readily available and cheapest materials is silica; and it is believed desirable to use silica in combination with ammonium hydroxide in that it provides a slight amount of soluble silicates for reaction with the nascent alumina that is produced by the dehydration which occurs during a fire.

While the invention has been described in considerable detail, I do not wish to be limited to the particular embodiments described; and it is my intention to cover hereby all novel adaptations, modifications, and arrangements thereof which come within the practice of those skilled in the art to which the invention relates.

I claim:

1. A hardenable mixture for forming a flame retarding surfacing material consisting essentially of the following ingredients in the following approximate parts by weight:

| | |
|---|---|
| Aluminium trihydrate | from 15 to 80 |
| Other inorganic fillers | from 0 to 50 |
| Aldehyde condensate resole [prepolymer] | from 15 to 45 |
| Fatty acid salt | from 0 to 4.0 |
| Ammonium hydroxide | from 0.1 to 3.0 |
| Acid salt catalyst | from 0.05 to 0.5 | said mixture being wetted out with sufficient water to form a handleable gel that becomes flowable at elevated temperatures before being thermoset.

2. A hardenable mixture for forming a flame retarding surfacing material consisting essentially of the following ingredients in approximate parts by weight:

| | |
|---|---|
| Aluminium trihydrate | from 20 to 40 |
| Other inorganic filler | from 35 to 50 |
| Titania | from 0 to 5 |
| Melamine-formaldehyde resole | from 15 to 30 |
| Fatty acid salt | from 1 to 5 |
| Ammonium chloride | from 0.05 to 0.5 |
| Ammonium hydroxide | from 0.5 to 3.0 | said mixture having an inorganic fibrous reinforcement embedded therein in an amount up to approximately 30% by weight of the above mixture, and said mixture being wetted out with sufficient water to form a handleable gel that becomes flowable at elevated temperatures before being thermoset.

3. The flame retardant material of claim 2 wherein said inorganic fibrous reinforcement comprises glass fibers.

4. The hardenable mixture of claim 2 wherein said inorganic fibrous reinforcement is glass fibers.

5. A hard flame resistant material formed by curing an aqueous gel of a mixture of the following solids when present within the following minimum and maximum parts by weight:

| | |
|---|---|
| Alumina trihydrate | 20 parts to 40 parts |
| Inert silica material | 35 parts to 50 parts |
| Aldehyde condensate resole | 15 parts to 30 parts |
| Zinc stearate | 1 part to 5 parts |
| NH$_4$Cl | 0.05 parts to 0.5 parts |
| Ammonium hydroxide | 0.5 parts to 3.0 parts | said mixture having been wetted out with sufficient water to form the handleable gel that was cured to form the hard flame resistant material.

6. The flame resistant material of claim 5 having from 1 to approximately 30% of a glass fiber reinforcement therein.

7. A hardenable resin system consisting essentially of an aqueous mixture of: an aldehyde condensate resole, generally insoluble salt of a fatty acid whose solubility in water increases with temperature and/or hydroxyl ion concentration, an effective amount of ammonium hydroxide to activate the fatty acid and retard the cure of the resole, and an effective amount of an acid salt to catalyze the cure of the resole when the ammonium hydroxide is removed.

8. The hardenable materials of claim 7 wherein the resin forming material of said resole contains more than approximately 30% by weight of nitrogen.

9. The hardenable materials of claim 8 wherein the resin forming material of said resole comprise a major proportion of melamine.

10. The hardenable materials of claim 9 wherein said salt of a fatty acid is selected from the group consisting of the calcium salts, the magnesium salts, and the zinc salts.

11. The hardenable materials of claim 7 wherein said salt of a fatty acid is selected from the group consisting of the calcium salts, the magnesium salts, and the zinc salts.

12. The hardenable material of claim 7 wherein said salt is zinc stearate.

13. The hardenable resin system of claim 7 wherein said resole consist principally of melamine aldehyde condensate formers and the salt of the fatty acid is zinc stearate.

14. A hard flame resistant material formed by curing a gelled mixture of water and the following solids when present within the following minimum and maximum parts by weight:

| | |
|---|---|
| Alumina trihydrate | 15 parts to 80 parts |
| Other inorganic fillers | 0 to 50 parts |
| Aldehyde condensate resole | 15 parts to 45 parts |
| Zinc stearate | 0 part to 4.0 parts |
| Ammonium acid salt | 0.05 parts to 0.5 parts |
| Ammonium hydroxide | 0.1 parts to 3.0 parts |

15. The flame resistant material of claim 14 having from 1 to approximately 30% of a glass fiber reinforcement therein.

* * * * *